United States Patent [19]

Terbrack et al.

[11] Patent Number: 5,003,624
[45] Date of Patent: Mar. 26, 1991

[54] AUTOMATIC BIAS CONTROLLER FOR ELECTRO-OPTIC MODULATOR

[75] Inventors: William H. Terbrack, Trabuco Canyon; Martin G. Lee, Garden Grove, both of Calif.

[73] Assignee: Hughes Aircraft Company, Los Angeles, Calif.

[21] Appl. No.: 501,689

[22] Filed: Mar. 29, 1990

[51] Int. Cl.$^5$ .............................................. G02F 1/00
[52] U.S. Cl. .................................. 455/618; 455/609; 455/610; 455/611; 455/612; 372/38; 350/356
[58] Field of Search ............... 455/618, 611, 610, 609, 455/608, 612; 372/26, 38; 350/355, 356

[56] References Cited

U.S. PATENT DOCUMENTS

| | | | |
|---|---|---|---|
| 4,369,525 | 1/1983 | Breton et al. | 455/618 |
| 4,471,494 | 8/1984 | Keil et al. | 455/618 |
| 4,504,976 | 3/1985 | Beaudet | 455/611 |
| 4,611,352 | 9/1986 | Fujito et al. | 455/609 |
| 4,709,416 | 11/1987 | Patterson | 455/609 |
| 4,718,118 | 1/1988 | Viola | 455/613 |
| 4,864,649 | 9/1989 | Tajima et al. | 455/609 |
| 4,903,273 | 2/1990 | Bathe | 372/38 |

OTHER PUBLICATIONS

Martin, W.; "A New Waveguide Switch/Modulator for Integrated Optics"; Applied Physics Letters; vol. 25, No. 10; May 1975; pp. 562–564.

*Primary Examiner*—Joseph A. Orsino
*Assistant Examiner*—Kinfe-Michael Negash
*Attorney, Agent, or Firm*—Terje Gudmestad; Wanda K. Denson-Low

[57] ABSTRACT

A low frequency pilot signal having predetermined positive and negative excursions is applied to an electrical modulation signal input (26) of a Mach-Zehnder electrooptic modulator (18) together with an electrical input signal. A bias voltage VB selected to bias the modulator (18) at a linear point (V$\pi$/2) is also applied to the signal input (26). The optical output signal of the modulator (18) is sensed, and the magnitudes of the positive and negative excursions of the output signal which correspond to the positive and negative excursions of the pilot signal are compared with each other. If the modulator (18) is linearly biased as desired, the excursions will have the same relative relationship as the excursions of the pilot signal. If the modulator (18) has drifted away from the linear bias point (V$\pi$/2), one excursion will have a larger magnitude relative to the other than in the pilot signal, indicating the direction of deviation. The bias voltage VB is automatically adjusted toward the linear bias point (V$\pi$/2). Where the bias voltage range includes a plurality of linear bias points (V$\pi$/2) within the limits thereof, the voltage difference (2V$\pi$) between two of the linear bias points (V$\pi$/2) is automatically measured at startup. If the modulator (18) drifts into one of the limits, the bias voltage VB is reset to a value spaced from the respective limit by the voltage difference (2V$\pi$), thereby automatically resetting the bias voltage VB to another linear point (V$\pi$/2) within the range.

23 Claims, 4 Drawing Sheets

AUTOMATIC BIAS CONTROLLER FOR ELECTRO-OPTIC MODULATOR

BACKGROUND OF THE INVENTION

1. Field of the Invention

The present invention generally relates to the art of optical data communications, and more specifically to an automatic bias controller for an electro-optic modulator such as a Mach-Zehnder modulator.

2. Description of the Related Art

Transmission of data using optical carriers enables very high bandwidths and numbers of multiplexed channels with low signal loss and distortion. A coherent laser light beam is amplitude modulated with a data signal, and propagates to a remote receiver either directly through the atmosphere, or via a system of optical fibers and repeaters. The light beam may advantageously be modulated with electrical signals in the microwave frequency range using an electro-optic modulator such as a Mach-Zehnder modulator or optical coupler.

A Mach-Zehnder electro-optic modulator per se is known in the art, as presented in an article entitled "A new waveguide switch/modulator for integrated optics", by W. Martin, Applied Physics Letters, vol. 26, no. 10, pp. 562-564 (May 1975). An electro-optic modulator based on a Mach-Zehnder interferometer generally includes a monolithic substrate formed of an electro-optic material such as $LiNbO_3$ or $ZnSe$. An optical waveguide is formed in the substrate having two arms or branches which extend generally in parallel with each other. The index of refraction of the material in the waveguide is higher than the index of refraction of the material of the substrate.

The branches have equal lengths. In the absence of an applied electrical bias voltage, an input optical or light beam produced by a laser or the like applied to the waveguide divides equally between the branches. The optical signals propagating through the branches recombine at the optical output of the waveguide in phase with each other, such that their amplitudes are additive and an optical output signal which is essentially similar to the optical input signal appears at the output of the waveguide.

Application of a predetermined electrical bias voltage differential to one branch of the waveguide relative to the other branch causes the indices of refraction of the material in the branches to vary differently due to the electro-optic effect, such that the effective optical lengths of the branches vary accordingly. At a bias voltage known in the art as $V\pi$, the effective optical lengths have varied to such an extent that the optical signals emerging from the branches are 180° out of phase with each other. The amplitudes of the signals combine subtractively, cancelling each other out, such that a zero output is produced at the optical output.

For most optical communication applications, it is desirable to bias the modulator at a voltage $V\pi/2$, which produces linear operation. However, device instabilities and environmental effects, especially temperature variations, cause the operating point to drift, and constant manual readjustment has been required to maintain the proper linear operating point. The linear bias point must be maintained during link operation to achieve maximum dynamic range, since second order harmonic and intermodulation distortion increase rapidly with increasing bias voltage error.

An electro-optic modulator system including a provision for manual bias voltage adjustment is illustrated in FIG. 1, and generally designated as 10. A laser 12 feeds a coherent light beam through an optical fiber 14 into an optical input 16 of a Mach-Zehnder modulator 18, optical coupler, or other appropriate electro-optic modulator. The light beam propagates through a waveguide having two branches 20 and 22, which recombine at an optical output 24 of the modulator 18. An electrical data signal, preferably in the microwave frequency range, is applied to the branch 20 via an electrical input line 25 and modulation signal "T" input 26. The optical carrier signal constituted by the laser beam is modulated with the data signal, and fed through an optical fiber 28 to a remote receiver (not shown).

In order to control the modulator 18 to linearly modulate the optical carrier with the data signal, it is necessary to bias the modulator 18 at a linear operating point corresponding to the voltage $V\pi/2$. In the prior art arrangement illustrated in FIG. 1, a tap 30 is provided in the output optical fiber 28 which leads through an optical fiber pigtail 32 to a photodetector 34. A second optical fiber pigtail 36 leads from the substrate of the modulator 18, and is designed to feed a portion of the light scattered into the substrate to a second photodetector 38. The photodetectors 34 and 38 produce electrical signals which are complementary inverses of each other. The correct bias point is initially determined by a complex manual procedure whereby both photodetector outputs are measured at the correct operating point. Manual adjustment of the bias voltage by means of a potentiometer 40 or the like, of a manual bias voltage controller 42, is performed to maintain the ratio of the two detector outputs constant. Constant monitoring and manual adjustment of the bias voltage is required to correct for variations in the operating point of the modulator 18. It is not feasible to implement the prior art system 10 as a practical industrial product.

SUMMARY OF THE INVENTION

The present invention overcomes the drawbacks of the prior art by providing automatic bias voltage control of an electro-optic modulator, preferably a Mach-Zehnder modulator, thereby enabling the manufacture of Microwave Modulated Fiber Optic Links (MMFOL) as viable industrial products. The present bias controller continuously and automatically maintains the modulator bias voltage at a linear point $V\pi/2$, compensating for drift of the operating point of the modulator caused by variations in ambient temperature and other effects. The controller is insensitive to optical power variations caused by laser instability or changes in optical fiber coupling efficiency, and requires only a single photodetector connected to the modulator.

The invention generally includes modulating an input bias signal with a pilot signal, sensing the portion of the modulator's output which corresponds to the pilot signal, sensing a non-linear relationship between the pilot signal and the sensed portion of the modulator output, and adjusting the DC bias level toward a more linear relationship.

More specifically, a low frequency pilot signal having predetermined positive and negative excursions is applied to an electrical modulation signal input of a Mach-Zehnder modulator, optical coupler, or other applicable electro-optic modulator together with an electrical input signal. A bias voltage selected to bias the modulator at a linear point is also applied to the signal input. The optical output signal of the modulator is sensed, and the magnitudes of the positive and negative excursions of the output signal which correspond to the positive and negative excursions of the pilot signal are compared with each other. If the modulator is linearly biased as desired, the excursions will have the same relative relationship as the excursions of the pilot signal. If the modulator has drifted away from the linear bias point, one excursion will have a larger magnitude relative to the other than in the pilot signal, indicating the direction of deviation. The bias voltage is automatically adjusted toward the linear bias point. Where the bias voltage range includes a plurality of linear bias points within the limits thereof, the voltage difference between two of the linear bias points is automatically measured at startup. If the modulator drifts into one of the limits, the bias voltage is reset to a value spaced from the respective limit by the voltage difference, thereby automatically resetting the bias voltage to another linear point within the range.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
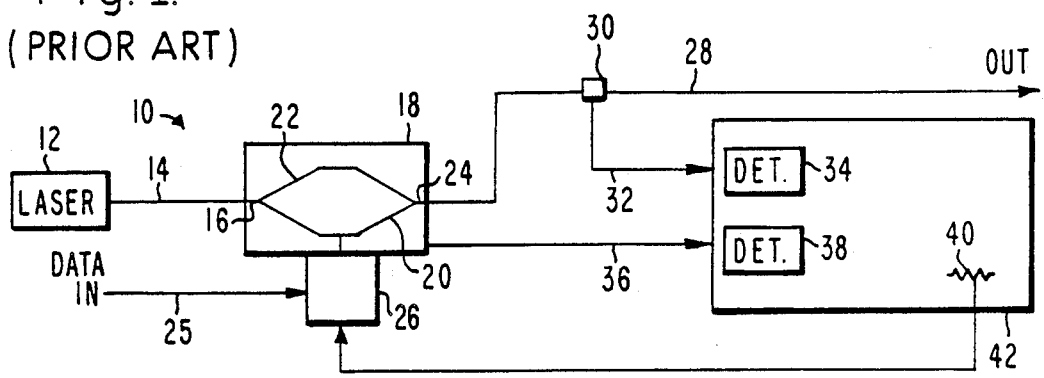
FIG. 1 is a simplified block diagram illustrating a prior art electro-optic modulator with manual bias voltage control.
Figure 2:
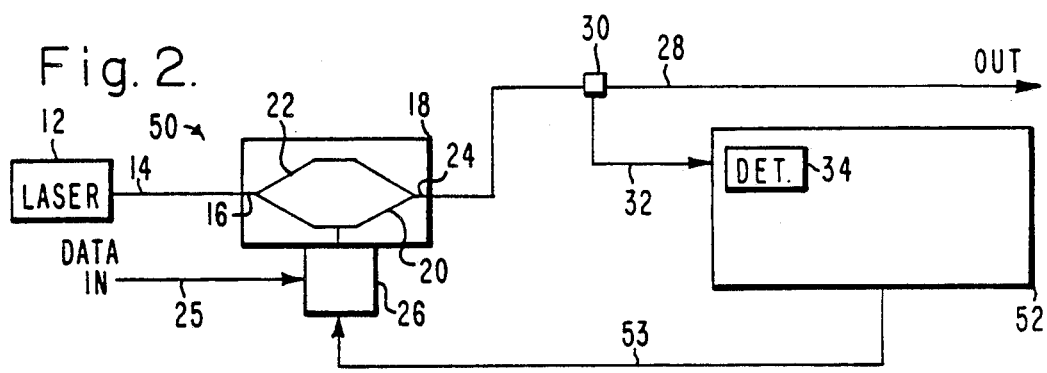
FIG. 2 is a simplified block diagram illustrating an electro-optic modulator including an automatic bias voltage controller embodying the present invention.

Referring now to FIG. 2 of the drawing, an electro-optic modulator system embodying the present invention is generally designated as 50, and includes elements illustrated and described above with reference to FIG. 1 which are designated by the same reference numerals and operate in a similar manner. It will be noted, however, that the system 50 does not require the second optical fiber pigtail 36 and photodetector 38 of the prior art system 10. The present system 50 includes an automatic bias voltage controller 52, which continuously maintains the modulator 18 biased at a linear point via a line 53, and will be described in detail with reference to FIGS. 3 to 7.

Figure 3:
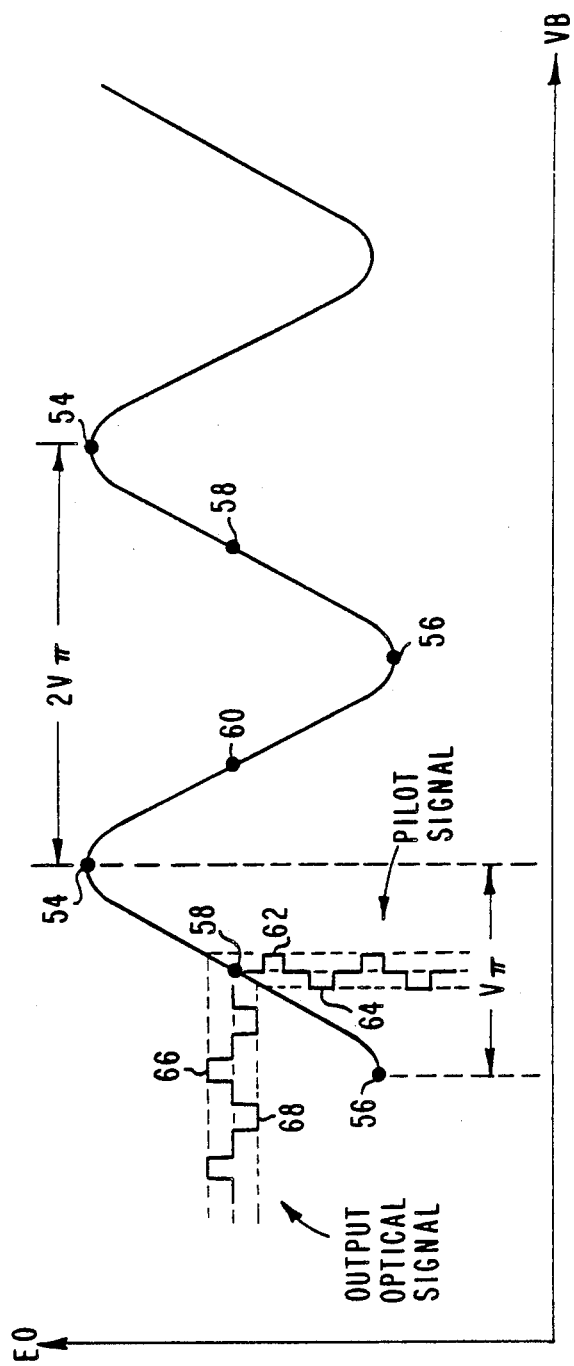
FIG. 3 is a graph illustrating the transfer function of a Mach-Zehnder modulator, with the optical output plotted as a function of applied bias voltage for operation of the present controller at a linear modulation bias point.
Figure 4:
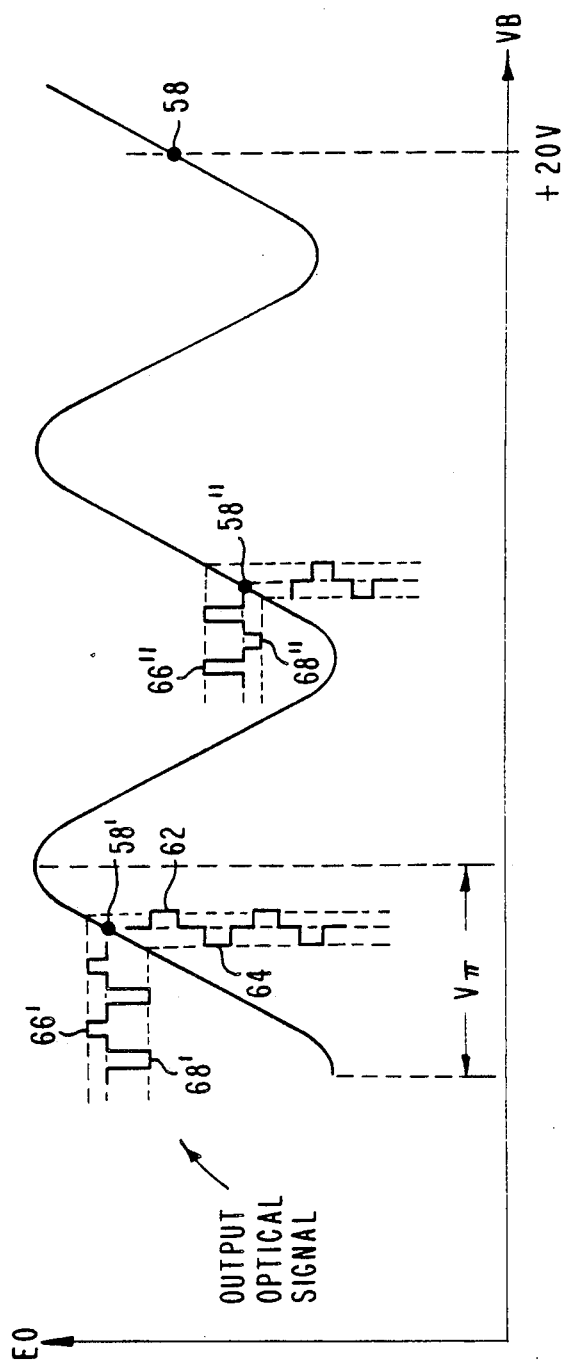
FIG. 4 is similar to FIG. 3, but illustrates operation at a points which are deviated from the linear bias point.

The principle of the present invention is illustrated in FIGS. 3 and 4. In both of these graphs, the horizontal axis represents applied modulator bias voltage VB, whereas the vertical axis represents the optical power output EO of the modulator 18 as a function of applied bias voltage VB. It will be seen that as the bias voltage is increased, the optical power increases and decreases in a sinusoidal manner. The sine curve appearing in the drawings has a plurality of positive peaks 54 and negative peaks 56. Linear bias voltage points 58 are constituted by positive inflection points in the rising portions of the sine curve between adjacent negative peaks 56 and positive peaks 54, whereas linear bias voltage points 60 are similarly constituted by negative inflection points between adjacent positive peaks 54 and negative peaks 56. Although operation at the negative inflection points 60 is within the scope of the invention, signal inversion will result therefrom, and further description of the invention will be limited to operation at the positive inflection points 58.

The linear bias points 58 have voltage values halfway between those of the peaks 54 and 56, and are the points $V\pi/2$ described above. In accordance with the present invention, the DC bias voltage applied to the modulation input 26 of the modulator 18 is amplitude modulated with a relatively low frequency pilot signal or tone. The pilot signal has a frequency of, for example 400 Hz, which is different from the frequency of the input signal on the line 25, and includes alternating positive and negative pulses or half-cycles 62 and 64 respectively. The half-cycles 62 and 64 preferably have a square waveform, although the invention may be practiced using a pilot tone having a sinusoidal or other waveform. Although the half-cycles are illustrated as being symmetrical and equally spaced in time, they may be separated in time by equal or unequal spacings if a suitable provision is made for sampling the half-cycles at the proper intervals.

The main requirement for the pilot signal is that the positive and negative half-cycles be constituted by waveform portions which have predetermined peak values or excursions relative to a predetermined reference level. Although the excursions are illustrated in the preferred example as being equal, with the reference level being equal to the bias voltage, the invention is not so limited. The excursions may have unequal peak values as long as the relationship of the magnitudes thereof relative to the reference value is predetermined. In addition, the positive and negative excursions may have different durations, as long as the durations are sufficient to enable sensing of the peak values of the excursions. Further description of the invention will be simplified by assuming that the positive and negative half-cycles or pulses have equal peaks or excursions relative to the bias voltage as illustrated.

With the modulator biased linearly as illustrated in FIG. 3, the electrical output signal of the photodetector 34, which corresponds to the optical output signal at the optical output of the modulator 24, includes positive half-cycles 66 and negative half-cycles 68 which are centered about the linear bias point 58 and correspond to the half-cycles 62 and 64 of the pilot signal respectively. The half-cycles 66 and 68 are equal in magnitude or amplitude.

FIG. 4 illustrates the bias voltage VB as being increased from the linear point 58 to a non-linear point 58'. The transfer function of the modulator 18 becomes non-linear, with the result that positive half-cycles 66' of the output signal have smaller amplitude than negative half-cycles 68'. With the bias voltage VB reduced from the linear point 58 to a non-linear point 58", positive half-cycles 66" have a larger amplitude than that of negative half-cycles 68". Therefore, the direction of deviation of the operating bias point from the linear value $V\pi/2$ can be sensed by determining which of the positive or negative half-cycles has the larger amplitude. The present controller 52 operates by automatically sensing the relative amplitudes of the positive and negative half-cycles 66 and 68, increasing the bias voltage VB if the amplitude of the positive half-cycles 66 is larger than the amplitude of the negative half-cycles 68, and decreasing the bias voltage VB if the amplitude of the positive half-cycles 66 is smaller than the amplitude of the negative half-cycles 68. In this manner, the bias voltage VB is continuously and automatically adjusted to the linear bias point 58 at which the amplitudes of the positive and negative half-cycles 66 and 68 are equal.

Figure 5:
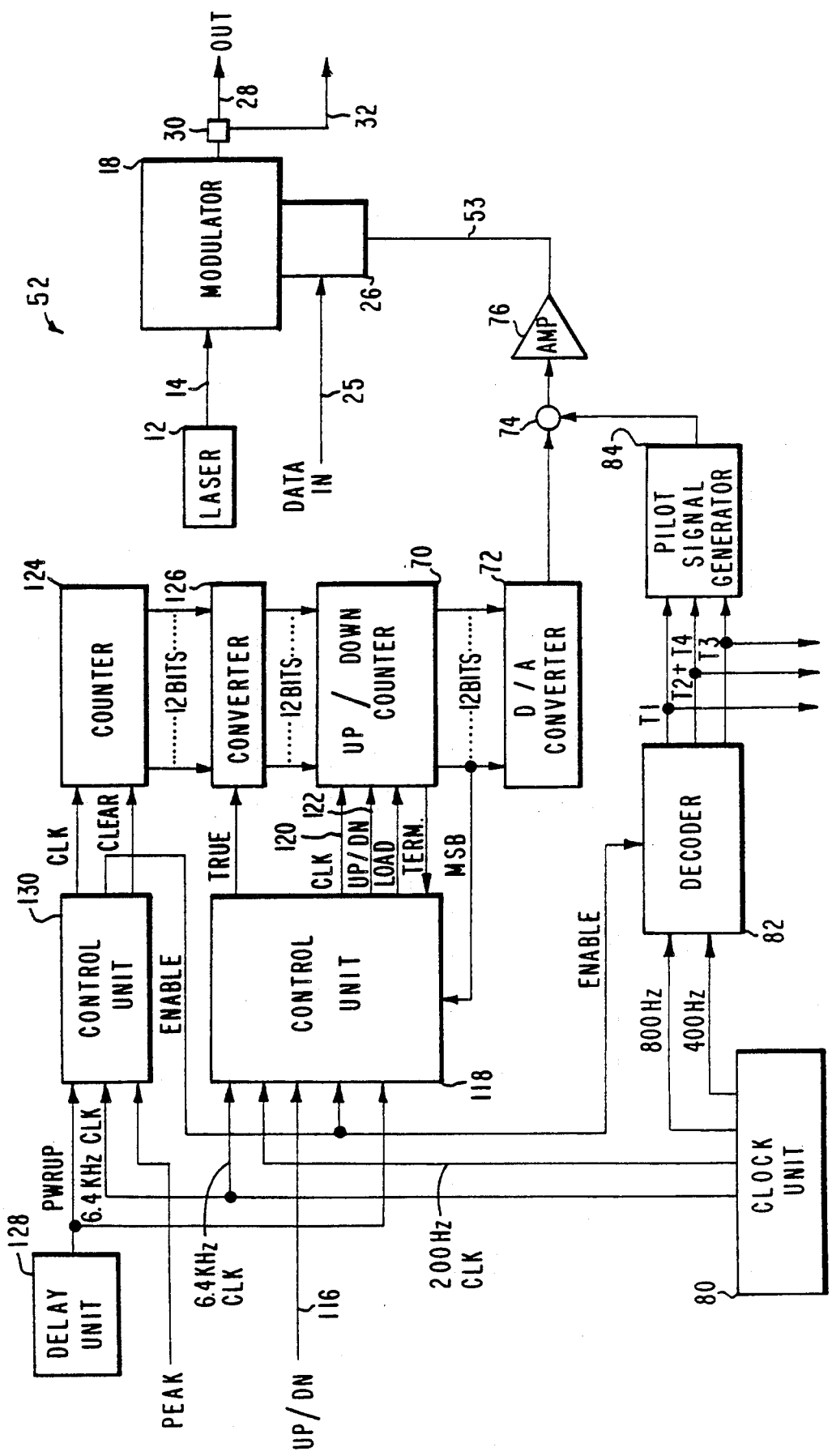
FIG. 5 is a block diagram illustrating a digital section of the present bias voltage controller.

Referring now to FIG. 5, the present bias voltage controller 52 includes an up-down counter 70 which stores therein a count value which determines the bias voltage VB. The counter 70 may be a 12-bit unit, having a count value which is variable from 0 to 4095. The output of the counter 70 is applied to an digital-to-analog converter 72, which converts the count value into a DC voltage which is applied through an analog adder or mixer 74 to a bias voltage amplifier 76. The amplifier 76 produces the bias voltage VB, which is applied through the line 53 to the modulation input 26 of the modulator 18. Where the voltage output of the converter 72 varies from $-10$ V (at a count value of 0) to $+10$ V (at a count value of 4095), and the amplifier 76 has a gain factor of two, the amplifier 76 will produce the output bias voltage VB having a range with limit values of $-20$ V and $+20$ V.

Figure 7:
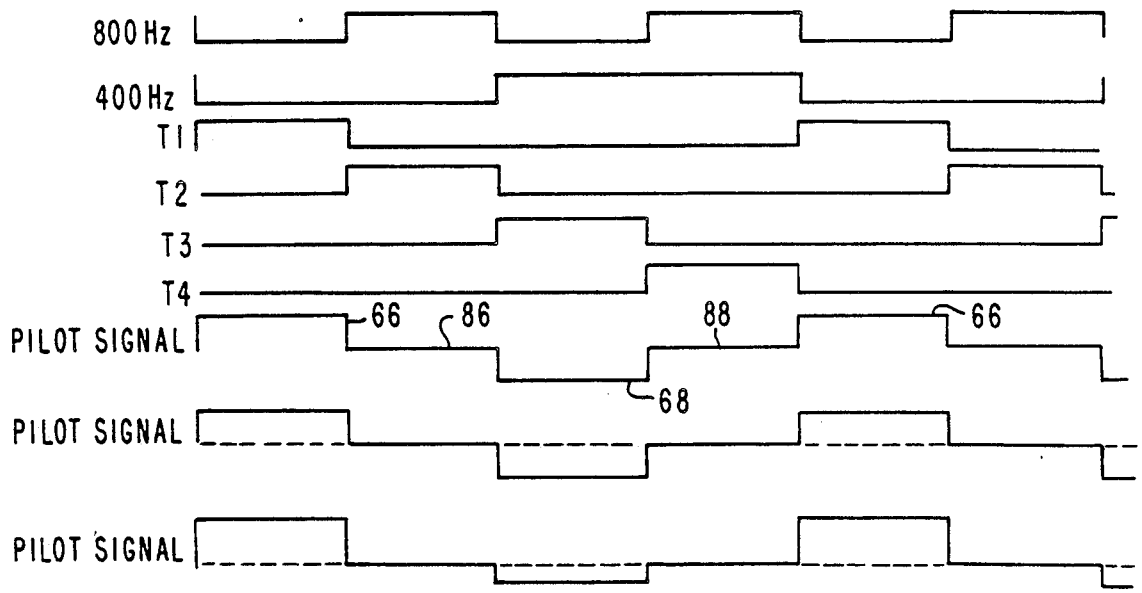
FIG. 7 is a timing diagram illustrating the operation of the present bias voltage controller.

The controller 52 further includes a clock pulse generator unit 80, which, although not shown in detail, typically incorporates therein a clock pulse generator which generates primary clock pulses at a frequency of 100 KHz, and frequency dividers which divide the primary clock pulses to produce system clock pulses at frequencies of 6.4 KHz, 200 HZ, 400 HZ, and 800 HZ. The 400 HZ and 800 HZ clock pulses are applied to a modulation signal timing decoder unit 82, which produces timing pulses T1, T2, T3 and T4 and applies the same to a modulation signal generator unit 84. The timing signals are synthesized from the 400 Hz and 800 Hz clock pulses as illustrated in the timing diagram of FIG. 7, and are themselves used to synthesize the pilot signal. As shown in FIG. 7, the pilot signal includes the positive half-cycles 66, negative half-cycles 68, zero-voltage spacing intervals 86 between adjacent half-cycles 66 and 68, and zero-voltage spacing intervals 88 between adjacent half-cycles 68 and 66.

Figure 6:
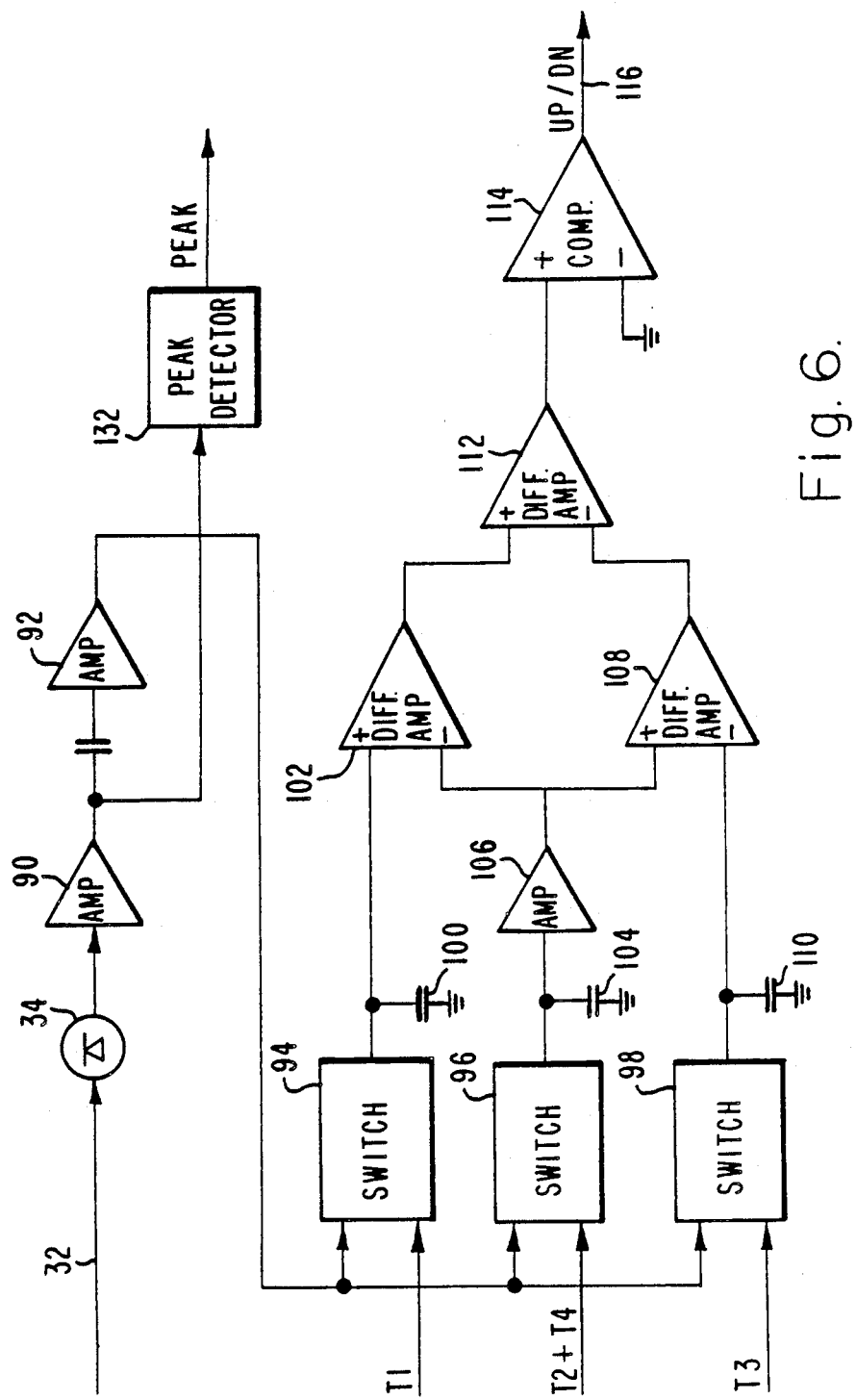
FIG. 6 is a block diagram illustrating an analog section of the present bias voltage controller.

Referring also to FIG. 6, the output of the photodetector 34 is applied through a trans-impedance amplifier 90 and voltage amplifier 92 to signal inputs of synchronous switches 94, 96 and 98. The timing pulses T1 which correspond to the positive half-cycles 66 of the pilot signal, are applied to a control input of the switch 94. The logical sum of the timing pulses T2 and T4, which corresponds to the spacing intervals 86 and 88 between the positive and negative half-cycles 66 and 68, is applied to a control input of the switch 96. The timing pulses T3, which correspond to the negative half-cycles 68 of the pilot signal, are applied to a control input of the switch 98.

The output of the switch 94 is connected across a sample and hold capacitor 100 to the non-inverting input of a differential amplifier 102. The output of the switch 96 is connected across a sample and hold capacitor 104 to the input of an amplifier 106, the output of which is connected to the inverting input of the differential amplifier 102 and to the non-inverting input of a differential amplifier 108. The output of the switch 98 is connected across a sample and hold capacitor 110 to the inverting input of the differential amplifier 108. The output of the differential amplifier 102 is connected to the non-inverting input of a differential amplifier 112, whereas the output of the differential amplifier 108 is connected to the inverting input of the differential amplifier 112. The output of the differential amplifier 112 is connected to the non-inverting input of a comparator 114, the inverting input of which is grounded.

The timing pulses T1, T2+T4, and T3 turn on the switches 94, 96 and 98 respectively for the durations of the respective timing pulses. The positive half-cycles 66 of the pilot signal are synchronously gated through the switch 94 and charge the capacitor 100 to the peak value of the half-cycles 66. The negative half-cycles 68 are similarly gated through the switch 98 to charge the capacitor 110. The capacitor 104 is charged to the voltage of the spacing intervals 86 and 88, which is approximately zero volts, and constitutes a median reference level.

The differential amplifier 102 produces an output voltage which is equal to the peak amplitude of the positive half-cycles 66 relative to the reference level of the spacing intervals. The differential amplifier 108 similarly produces an output voltage representing the peak amplitude of the negative half-cycles 68. It will be noted that although the voltage across the capacitor 110 is negative, the output of the differential amplifier 108 will be positive due to the reversed connections of the signal and reference level inputs thereof. The differential amplifier 112 produces an output voltage which is equal to the difference between the output voltages of the differential amplifiers 102 and 108. The output of the amplifier 112 will be positive if the amplitude of the positive half-cycles 66 is larger than the amplitude of the negative half-cycles 68, and negative if the relationship is opposite. The comparator 114 converts the analog output of the differential amplifier 112 into a digital logic signal, producing a logically high output in response to a positive input, and a logically low output in response to a negative input.

The output of the differential amplifier 114 is connected through a line 116 to a control unit 118. During normal operation of the system 50, the control unit 118 feeds 200 Hz clock pulses through a line 120 to the clock input of the counter 70, causing the counter 70 to count continuously. The direction in which the count value in the counter 70 changes in response to the clock pulses is determined by the logical state of an up/down control signal applied to the counter 70 through a line 122.

Assuming that the bias voltage VB drifts below the linear point 58, the amplitude of the positive half-cycles 66 will become larger than the amplitude of the negative half-cycles 68, and the comparator 114 will produce a logically high output. In response, the control unit 118 applies a signal on the line 122 causing the counter 70 to count up in response to the clock pulses. As the count value in the counter 70 increases, the output voltage of the digital-to-analog converter 72 and thereby the bias voltage VB increase, so that the bias voltage is increased toward the linear point 58. This operation continues until the bias voltage VB exceeds the linear point 58, the amplitude of the positive half-cycles 66 becomes smaller than the amplitude of the negative half-cycles 68, and the output of the comparator 114 goes logically low. When this occurs, the control unit 118 changes the logical sense of the signal on the line 122, and causes the counter 70 to count down and thereby reduce the bias voltage VB toward the linear point 58.

In this manner, the controller 52 continuously hunts around the linear bias point 58. If desired, the controller 52 may be modified to produce a hysteresis or dead band around the linear bias point 58. Although the relative polarities or logical senses of the control signals have been described as "positive" and "negative", it will be understood that the relative polarities may be reversed at any point in the system from the particular exemplary arrangement described above, as long as a deviation of the bias voltage from a linear point in a particular direction results in the system adjusting the bias voltage in the opposite direction back toward the linear point.

It has been determined in practice that the operating point can be maintained to within ±20 mV over an operating range of ±20 V. Microwave modulation levels in the range of 0 dBm to +12 dBm produced second harmonic suppression of 35±5 dBc down from the fundamental. The second harmonic suppression levels frequently determine the dynamic range of a modulator used in microwave links. The present invention enables the design of optical communication links with 35 dB of dynamic range for microwave input levels up to 10 dBm. At lower microwave input levels, the second harmonic suppression increases, whereas at higher input levels, it decreases.

The operation of the present system 50 includes three modes:
  (1) Startup and calibration mode.
  (2) Normal servo mode.
  (3) Reset mode in which the bias voltage is automatically reset from one linear operating point to another if the first linear point drifts into one of the −20 V or +20 V limit values of the bias voltage operating range.

The normal servo mode (2) was described in detail above, and consists of adjusting the bias voltage VB to a linear point in response to fluctuations in the modulator operating point caused by variations in ambient temperature, etc.

The startup and calibration mode (1) includes initially setting the bias voltage VB to a linear operating point. This function is accomplished using a $2V\pi$ memory which may be embodied as a 12 bit counter 124. The counter 124 is used to measure and store the bias voltage difference $2V\pi$ between adjacent positive peaks 54 or negative peaks 56. The voltage difference $2V\pi$ is also the difference between adjacent linear bias points 58, and between adjacent negative slope linear bias points 60. The parallel outputs of the counter 124 are applied through a controllable true/complement converter 126 to parallel inputs of the counter 70.

When the system 50 is first energized, a power-up time delay unit 128 feeds a power-up signal PWRUP to a $2V\pi$ calibration timing and control unit 130 and to the control unit 118 after a time delay which is sufficient for all operating voltages in the system 50 to reach normal levels. In response to the PWRUP signal, the control unit 118 clears the counter 70, sets the line 122 to command the counter 70 to count up, and applies a negative ENABLE signal to the control unit 118 which causes the same to gate 6.4 KHz clock pulses to the counter 70. Further in response to the PWRUP signal, the control unit 130 clears the $2V\pi$ counter 124.

During the calibration period, the control unit 130 feeds the negative ENABLE signal to the decoder unit 82, which inhibits the unit 82 from feeding clock pulses to the signal generator unit 84. Thus, the voltage applied to the signal input 26 of the modulator 18 consists of the pure DC bias voltage VB.

The clock pulses applied to the counter 70 cause the bias voltage VB to be swept or ramped up from −20 V toward +20 V. The system 50 further includes a peak detector 132 which produces and feeds an output signal PEAK to the control unit 130 in response to sensing a positive or negative peak 54 or 56 in the output signal from the amplifier 90. In response to the first PEAK signal, the control unit 130 begins gating 6.4 KHz clock pulses therethrough to the counter 124, causing the same to count up. No action is taken in response to the second PEAK signal, although the system may be modified to measure the voltage difference between adjacent peaks 54 and 56 and multiply the measured value by two. In response to the third PEAK signal, the control unit 130 terminates gating the clock pulses to the counter 124, causing the count therein to subsequently remain unchanged. The final count value in the counter 124 corresponds to the measured voltage difference $2V\pi$ between two adjacent peaks 54 or 56, and to the voltage difference between two linear operating points 58.

In response to the third PEAK signal, the control unit 130 changes the sense of the ENABLE signal from negative to positive, causing the decoder 82 to feed the timing pulses T1, T2+T4, and T3 to the signal generator unit 84 to initiate the normal servo mode (2) operation. The positive ENABLE signal also causes the control unit 118 to feed the 200 Hz clock pulses, rather than the 6.4 KHz clock pulses, to the counter 70. The count in the counter 70 at the termination of the calibration or $2V\pi$ voltage difference measuring operation corresponds to third sensed peak value 54 or 56, which may be positive or negative respectively. The normal servo operation of the system 50 will result in automatic adjustment of the bias voltage to the closest linear bias voltage point 58.

The reset mode (3) is automatically invoked when the operating point of the modulator 18 drifts into one of the −20 V or +20 V limits. As illustrated in FIG. 4, the rightmost linear bias point 58 is illustrated as drifting into the +20 V limit. The operation is similar when a leftmost bias point drifts into the −20 V limit, although not shown in the drawing.

The reset mode (3) of operation of the system 50 utilizes the fact than when the linear operating point drifts into a limit, the next linear operating point is spaced back into the bias voltage range from the limit by the value $2V\pi$. Thus, system operation from an operating point which drifted into the −20 V limit can be restored by resetting the count value in the counter 70 from −20 V to $2V\pi$. Similarly, operation from drift into the +20 V limit can be restored by resetting the count value in the counter 70 from 4095 to $(4095 - 2V\pi)$.

The reset operation is performed by the control unit 118 in combination with the true/complement converter 126. When the counter 70 reaches a 0 or 4095 count, it feeds a terminal count signal TERM to the control unit 118. The counter 70 also applies a signal MSB to the control unit 118. The signal MSB corresponds to the most significant bit of the count in the counter 70, having a logically low value when the count in the counter 70 is zero, and a logically high value when the count in the counter 70 is 4095. Thus, the control unit 118 is able to determine whether the counter 70 has reached the lower or upper limit.

In response to a count of 0, the control unit 118 feeds a TRUE signal to the converter 126 which causes the same to apply the parallel output of the counter 124 to the parallel input of the counter 70 in unaltered form. The control unit 118 also feeds a LOAD signal to the counter 70 which causes the 0 count to be replaced by the value of $2V\pi$ from the converter 126.

In response to a count of 4095, the control unit inverts the logical state of the TRUE signal, causing the converter 126 to apply the two's complement of the count value in the counter 124 to the counter 70. The two's complement of $2V\pi$ is equal to $(4095-2V\pi)$ which is the count value desired to be set into the counter 70 in response to drift of the operating point into the 4095 count limit. After resetting of the operating point, the system 50 reverts back to the normal servo mode (2) of operation.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. An automatic bias controller for an electro-optic modulator having an optical input for receiving an optical input signal, an optical output, and an electrical modulation input, comprising:

pilot signal generator means for modulating a bias voltage applied to the modulation input of the modulator with a pilot signal having predetermined positive and negative excursions relative to a reference level;

detector means for comparing positive and negative excursions relative to a reference level of an output signal at the optical output of the modulator, which correspond to the positive and negative excursions and reference level of the pilot signal respectively; generating a control signal having a first logical sense when the positive excursion of the output signal is larger relative to the negative excursion thereof than the positive excursion of the pilot signal is relative to the negative excursion thereof; and generating a control signal having a second logical sense when the positive excursion of the output signal is smaller relative to the negative excursion thereof than the positive excursion of the pilot signal is relative to the negative excursion thereof; and bias voltage control means for controlling, in accordance with the first or second logical sense of the control signal, adjustment of the bias voltage in a direction to cause the positive and negative excursions of the output signal to approach said relative values of the positive and negative excursions of the pilot signal.

2. A bias controller as in claim 1, further including bias voltage source means for generating the bias voltage, comprising:

counter means for producing a count value; and digital-to-analog converter means for producing the bias voltage as corresponding to the count value in the counter means;

wherein the control means is constructed to increase or decrease the count value in the counter means in response to the first or second logical sense of the control signal respectively.

3. A bias controller as in claim 1, in which:

the source means is constructed to generate the bias voltage within a predetermined range which includes a plurality of linear bias voltage values of the modulator at which the positive and negative excursions of the output signal have said relative values of the positive and negative excursions of the pilot signal;

the control means controlling the source means to adjust the bias voltage toward a nearest one of the linear bias voltage values.

4. A bias controller as in claim 1, in which:

the source means is constructed to generate the bias voltage within a predetermined range having first and second limit values, the range including a plurality of linear bias voltage values of the modulator at which the positive and negative excursions of the output signal have said relative values of the positive and negative excursions of the pilot signal;

the control means further includes:

measuring means for measuring and storing a difference value corresponding to a voltage difference between two of the linear bias voltage values;

limit sensing means for sensing when the bias voltage has reached the first or second limit value; and reset means for adding the difference value stored in the measuring means to the first limit value, or subtracting the difference value from the second limit value, in response to sensing of the first or second limit value respectively by the limit sensing means.

5. A bias controller as in claim 4, in which the measuring means is constructed to measure the difference value as corresponding to a voltage difference between said two of the linear bias voltage values which are separated from each other by a third of the linear bias voltage values.

6. A bias controller as in claim 4, in which the measuring means comprises means for sweeping the bias voltage from the first limit value toward the second limit value, sensing first and second peak values of the output signal, and determining the difference value as a voltage difference between first and second values of the bias voltage at the first and second peak values respectively.

7. A bias controller as in claim 6, in which the measuring means comprises means for terminating said sweep of the bias voltage in response to sensing of the second peak value, and controlling the source means to set the bias voltage to the difference value.

8. A bias controller as in claim 1, in which the electro-optic modulator is a Mach-Zehnder modulator.

9. A bias controller as in claim 1, further comprising photosensor means for generating an electrical output signal in response to an optical output signal at the optical output of the modulator, the detector means comparing positive and negative excursions of the electrical output signal.

10. A bias controller as in claim 1, in which the generator means is constructed to generate the pilot signal such that the positive and negative excursions thereof are equal.

11. A bias controller as in claim 10, in which the reference level of the pilot signal is equal to the bias voltage.

12. A method of automatically controlling a bias voltage applied to an electrical modulation input of an electro-optic modulator having an optical input for receiving an optical input signal, and an optical output, comprising the steps of:
   (a) modulating the bias voltage with a pilot signal having predetermined positive and negative excursions relative to a reference level;
   (b) sensing and comparing positive and negative excursions relative to a reference level of an output signal at the optical output of the modulator, which correspond to the positive and negative excursions and reference level of the pilot signal respectively; and
   (c) adjusting the bias voltage in a direction to cause the positive and negative excursions of the output signal to approach said relative values of the positive and negative excursions of the pilot signal.

13. A method as in claim 12, in which the bias voltage is capable of adjustment within a predetermined range having first and second limit values, the range including a plurality of linear bias voltage values of the modulator at which the positive and negative excursions of the output signal have the relative values of the positive and negative excursions of the pilot signal, the method further comprising the steps of:
   (d) measuring a voltage difference value between two of the linear bias voltage values;
   (e) sensing when the bias voltage has reached the first or second limit value;
   (f) setting the bias voltage to a value equal to the first limit value plus the difference value when the bias voltage is sensed at the first limit value in step (e); and
   (g) setting the bias voltage to a value equal to the second limit value minus the difference value when the bias voltage is sensed at the second limit value in step (e).

14. A method as in claim 13, in which step (d) comprises measuring the difference value as corresponding to a voltage difference between said two of the linear bias voltage values which are separated from each other by a third of the linear bias voltage values.

15. A method as in claim 13, in which step (d) comprises the substeps of:
   (h) sweeping the bias voltage from the first limit value toward the second limit value;
   (i) sensing first and second peak values of the output signal; and
   (j) determining the difference value as a voltage difference between first and second values of the bias voltage at the first and second peak values respectively.

16. A method as in claim 15, in which step (d) further comprises the substeps of:
   (k) terminating said sweep of the bias voltage in response to sensing of the second peak value; and
   (l) setting the bias voltage to the difference value.

17. In an electro-optical modulator having an optical input for receiving an optical input signal, an optical output, and an electrical DC-biased modulating signal input, said modulator having a substantially linear relationship between the DC bias level of said modulating signal and said output when said DC bias is at a predetermined level, and a non-linear relationship for DC biases removed from said predetermined level, the improvement comprising an automatic bias controller for maintaining the bias voltage at said predetermined level, said automatic bias controller comprising:
   means for modulating the input bias signal with a pilot signal having alternating positive and negative pulses;
   means for sensing alternations in the modulator's output which correspond to said pilot signal; and
   feedback means responsive to a non-linear relationship between said pilot signal and said sensed output alternations for adjusting the DC bias level toward a more linear relationship.

18. A bias controller as in claim 17, in which the positive and negative pulses of the pilot signal are symmetrical about the DC bias level.

19. A bias controller as in claim 17, in which the pilot signal has spacing intervals between the positive and negative pulses.

20. A bias controller as in claim 19, in which the pilot signal has a predetermined DC level during the spacing intervals, the positive and negative pulses being symmetrical about said predetermined DC level.

21. A bias controller as in claim 17, in which frequencies of the pilot signal and said modulating signal are different.

22. A bias controller as in claim 17, in which the feedback means comprises means for generating a control signal having a logical sense corresponding to the direction of deviation of the DC bias level from the linear relationship, and adjusting the DC bias level in accordance with the sense of the control signal.

23. In an electro-optical modulator having an optical input for receiving an optical input signal, an optical output, and an electrical DC-biased modulating signal input, said modulator having a substantially linear relationship between the DC bias level of said modulating signal and said output when said DC bias is at a predetermined level, and a non-linear relationship for DC biases removed from said predetermined level, the improvement comprising an automatic bias controller for maintaining the bias voltage at said predetermined level, said automatic bias controller comprising:
   means for modulating the input bias signal with a pilot signal;
   means for sensing the portion of the modulator's output which corresponds to said pilot signal; and
   means responsive to a non-linear relationship between said pilot signal and said sensed portion of the modulator output for adjusting the DC bias level toward a more linear relationship.

* * * * *